US012038072B1

(12) United States Patent
Ziskovsky et al.

(10) Patent No.: US 12,038,072 B1
(45) Date of Patent: Jul. 16, 2024

(54) LINE OF TRANSMISSIONS AND METHOD FOR OPERATING THE TRANSMISSIONS

(71) Applicant: Dana Heavy Vehicle Systems Group, LLC, Maumee, OH (US)

(72) Inventors: Darren J. Ziskovsky, Bowling Green, OH (US); Gustav Johnson, Canton, MI (US); Jordan M. Houser, Sylvania, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/186,727

(22) Filed: Mar. 20, 2023

(51) Int. Cl.
*F16H 3/00* (2006.01)
*B60K 17/02* (2006.01)

(52) U.S. Cl.
CPC ............. *F16H 3/006* (2013.01); *B60K 17/02* (2013.01); *F16H 2200/0021* (2013.01); *F16H 2200/0043* (2013.01)

(58) Field of Classification Search
CPC ............. F16H 3/006; F16H 2200/0021; F16H 2200/0043; B60K 17/02
USPC ............................................. 74/330
See application file for complete search history.

(56) References Cited

U.S. PATENT DOCUMENTS

| | | | | |
|---|---|---|---|---|
| 10,330,176 | B2 * | 6/2019 | Lee | F16H 3/006 |
| 11,440,513 | B2 * | 9/2022 | Plow | B62D 63/04 |
| 2007/0289399 | A1 | 12/2007 | Tanba et al. | |
| 2014/0213410 | A1 * | 7/2014 | Mori | B60W 10/02 |
| | | | | 180/65.265 |
| 2020/0116244 | A1 * | 4/2020 | Mittelberger | B60K 1/00 |
| 2021/0025480 | A1 * | 1/2021 | Galsworthy | F16H 61/688 |
| 2023/0025121 | A1 * | 1/2023 | Waltz | B60K 17/12 |
| 2023/0191897 | A1 * | 6/2023 | Rulfi Fertilio | B60K 6/448 |
| | | | | 475/5 |
| 2024/0068560 | A1 * | 2/2024 | Irato | F16H 3/00 |

FOREIGN PATENT DOCUMENTS

| | | |
|---|---|---|
| DE | 102016221794 A1 | 5/2018 |
| DE | 202021101598 U1 | 9/2022 |

OTHER PUBLICATIONS

Slesinski, S. et al., "Systems and Methods for an Electric Axle," U.S. Appl. No. 18/051,436, filed Oct. 31, 2022, 31 pages.

* cited by examiner

*Primary Examiner* — Ha Dinh Ho
(74) *Attorney, Agent, or Firm* — McCoy Russell LLP

(57) ABSTRACT

In one example, a line of transmissions is provided comprising, a first transmission and a second transmission. Each transmission includes an input shaft with a first pair of gears arranged thereon and a first clutch positioned therebetween designed to selectively rotationally couple at least one of a first gear and a second gear of the first pair of gears to the input shaft. Each transmission includes a layshaft with a second pair of gears fixedly coupled thereto. Each transmission includes an output shaft with a third pair of gears arranged thereon and a second clutch positioned therebetween designed to selectively rotationally couple at least one of a third gear and a fourth gear in the third pair of gears to the output shaft. The first transmission has the second gear fixed to the input shaft. The second transmission has the fourth gear fixed to the output shaft.

20 Claims, 5 Drawing Sheets

| Transmission | Speeds | Clutch for shift | Fixed gear | Clutch for park lock | Gear to engage park lock clutch |
|---|---|---|---|---|---|
| 1 | Modes 1 and 2 | 156 | 132 | 134 | 130 |
| 2 | Modes 2 and 4 | 134 | 154 | 156 | 152 |
| 3 | Modes 1 and 3 | 134 | 152 | 156 | 154 |
| 4 | Modes 3 and 4 | 156 | 130 | 134 | 132 |

LINE OF TRANSMISSIONS AND METHOD FOR OPERATING THE TRANSMISSIONS

TECHNICAL FIELD

The present disclosure relates to a line of transmissions having a park lock function.

BACKGROUND AND SUMMARY

Multi-speed transmissions have been used in some vehicles. When multi-speed transmissions are used in electric vehicles, motor efficiency and motor range can be increased. The transmissions in electric vehicles may have reduced complexity, increased responsiveness, and lower fuel cost when compared to transmissions used in combustion engine drivetrains.

For some applications, such as commercial vehicles under certain load thresholds and vehicles intended for certain vocations, a multi-speed transmission having a parking brake or park lock may be desired. Adding a park lock to existing powertrains may demand substantial redesign such as using an external parking brake or an additional clutch, and considerable modifications to the powertrain in an already compact and challenging packaging environment.

The inventor has recognized the aforementioned challenges and developed a line of transmissions to address at least a portion of the challenges. In one example, a line of transmissions, comprising: a first transmission; a second transmission; wherein each transmission includes an input shaft with a first pair of gears that reside thereon; a first clutch positioned between the first pair of gears and designed to selectively rotationally couple at least one of a first gear and a second gear of the first pair of gears to the input shaft; a layshaft with a second pair of gears fixedly coupled thereto; an output shaft with a third pair of gears that reside thereon; and a second clutch positioned between the third pair of gears and designed to selectively rotationally couple at least one of a third gear and a fourth gear in the third pair of gears to the output shaft, wherein the first transmission has the second gear of the first pair of gears fixed to the input shaft and the first clutch selectively couples the first gear of the first pair of gears to the input shaft to realize a park lock function, and wherein the second transmission has the fourth gear of the third pair of gears fixed to the output shaft and the second clutch selectively couples the third gear of the third pair of gears to the output shaft to realize the park lock function. In this way, a park lock may be added to an existing powertrain without substantial redesign of the transmission.

In another example, a third transmission has the third gear of the third pair of gears fixed to the output shaft and the second clutch selectively couples the fourth gear of the third pair of gears to the output shaft to realize the park lock function. In yet another example, a fourth transmission has the first gear of the first pair of gears fixed to the input shaft and the first clutch selectively couples the second gear of the first pair of gears to the input shaft to realize the park lock function. In this way a common set of gearbox components may satisfy a variety of applications.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A line of transmissions using a first clutch to shift gears and a second clutch to selectively engage a park lock is herein disclosed. The line of transmissions may be built from common set of gearbox parts included in a multi-speed, dual-clutch transmission that compactly achieves at least three gear ratios via a gearing arrangement on three parallel shafts. The three parallel shafts include an input shaft with a first clutch that is designed to selectively engage at least one of a first gear and a second gear of a first pair of gears that are arranged coaxial to the input shaft. Further, a layshaft in the transmission includes a second pair of gears fixedly coupled thereto. An output shaft in the transmission includes a second clutch designed to selectively engage at least one of a third gear and a fourth gear of a third pair of gears that are coaxial to the output shaft. By fixing a selected gear of one of the first pair of gears and the third pair of gears to the respective input or output shaft, a two-speed transmission with a park lock function may be realized. In this way, a parking lock may be provided by sacrificing a speed of the multi-speed transmission, where the lock-up occurs between a rotatable gear and a gear fixed to a shaft of a clutch. The two speeds may be selected for the application and the transmission built accordingly. Thus, a common set of gearbox components included in an existing multi-speed powertrain may satisfy a variety of applications.

Figures 1, 2:
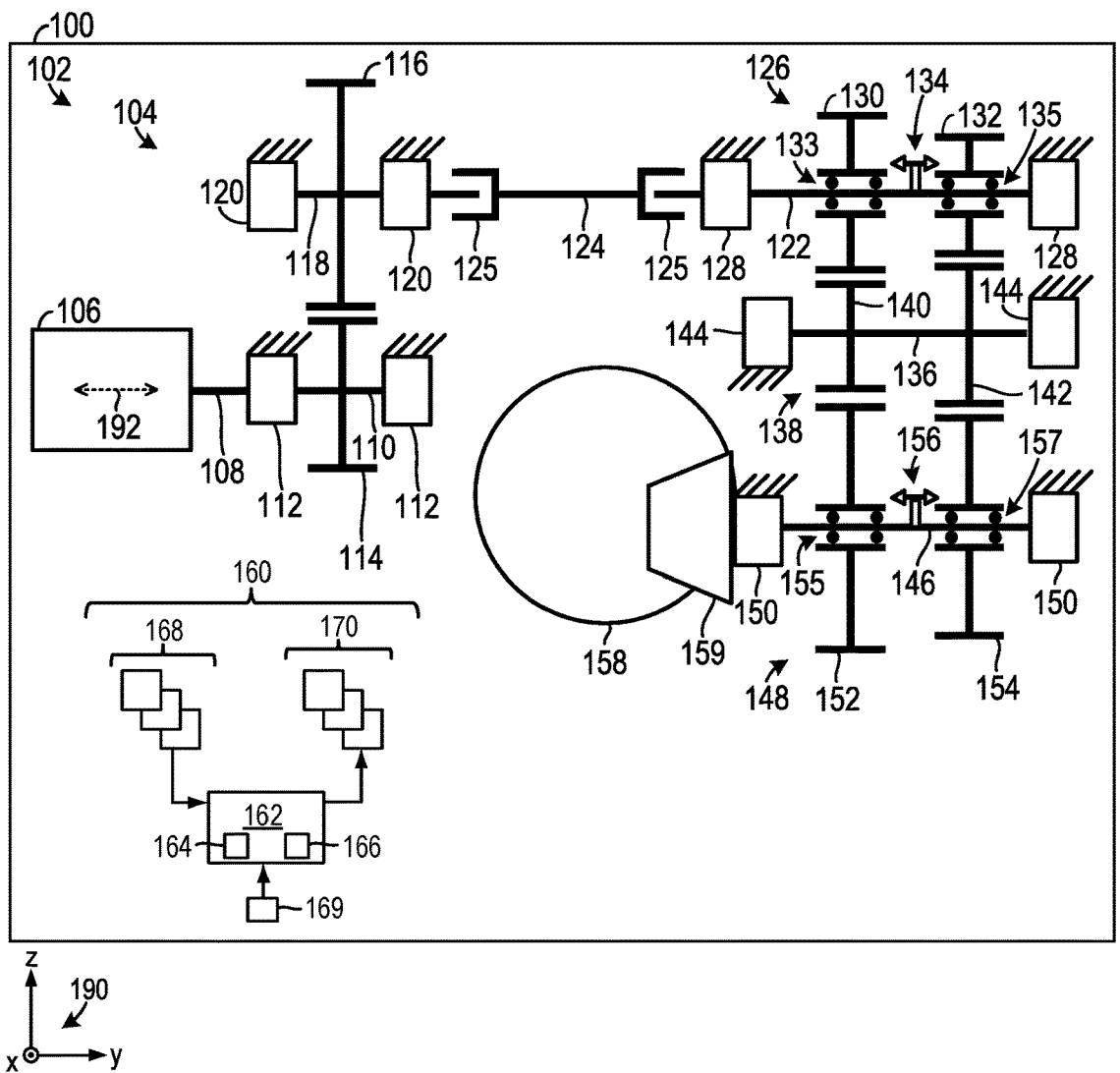
FIG. 1 shows a multi-speed, dual-clutch transmission.
FIG. 2 shows a table of a line of transmissions providing two speeds and a park lock built from the transmission depicted in FIG. 1.
Figure 3:
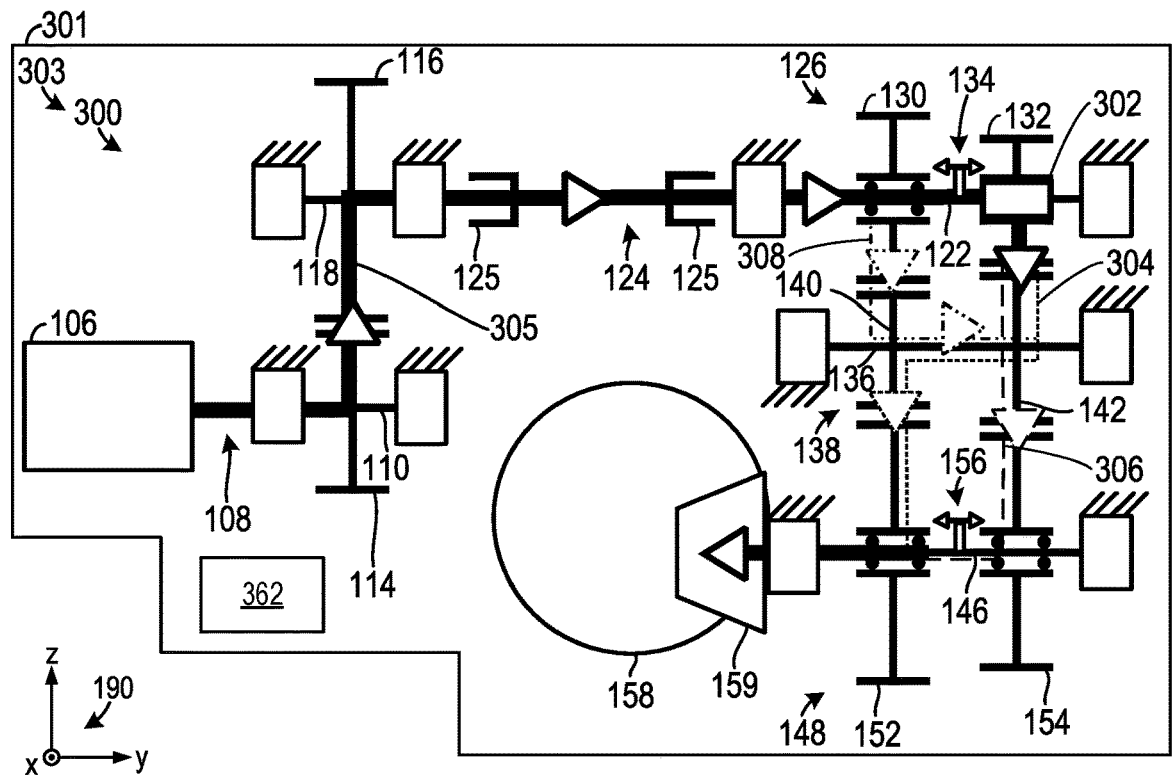
FIG. 3 shows a first transmission and power paths through the first transmission of the line of transmissions depicted in FIG. 2.
Figure 4:
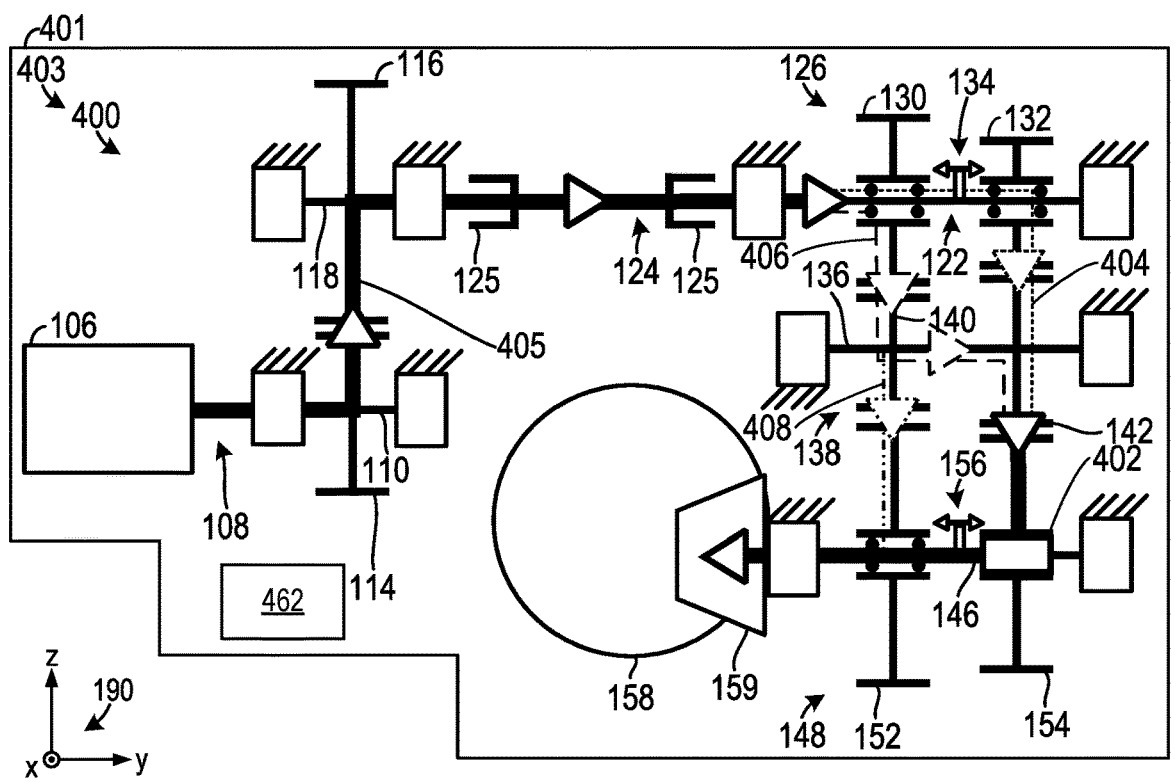
FIG. 4 shows a second transmission and power paths through the second transmission of the line of transmissions depicted in FIG. 2.
Figure 5:
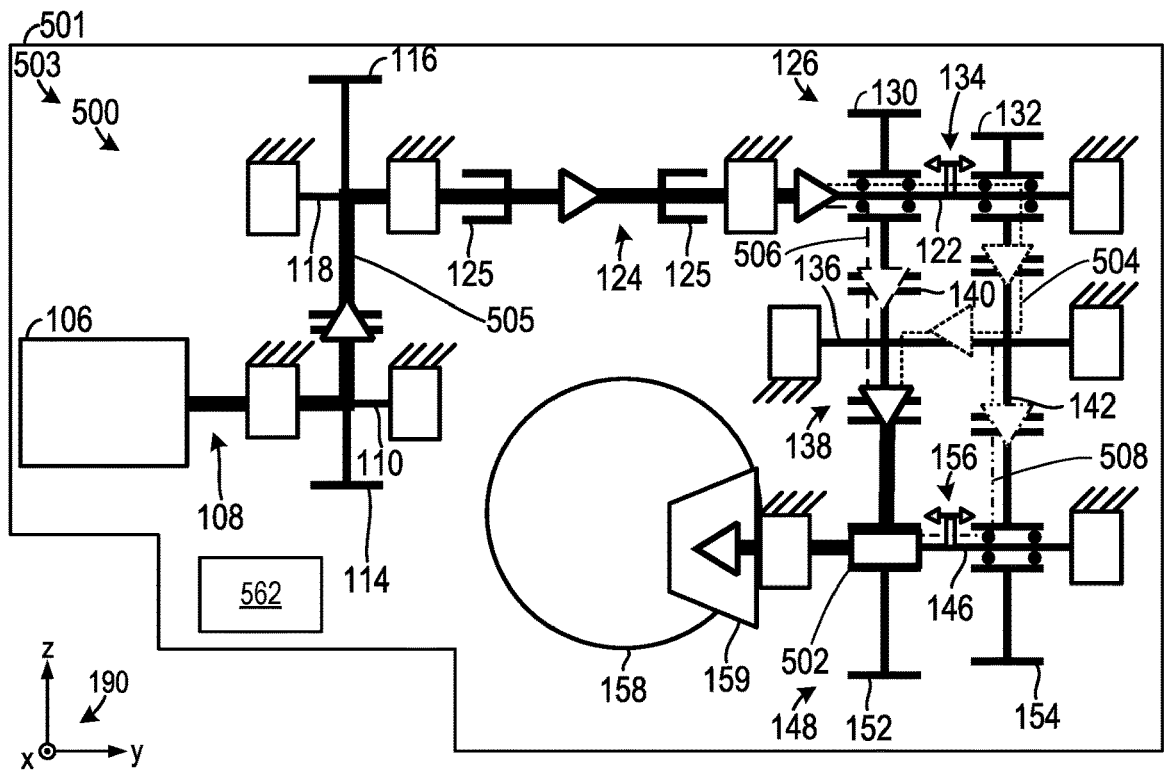
FIG. 5 shows a third transmission and power paths through the third transmission of the line of transmissions depicted in FIG. 2.
Figure 6:
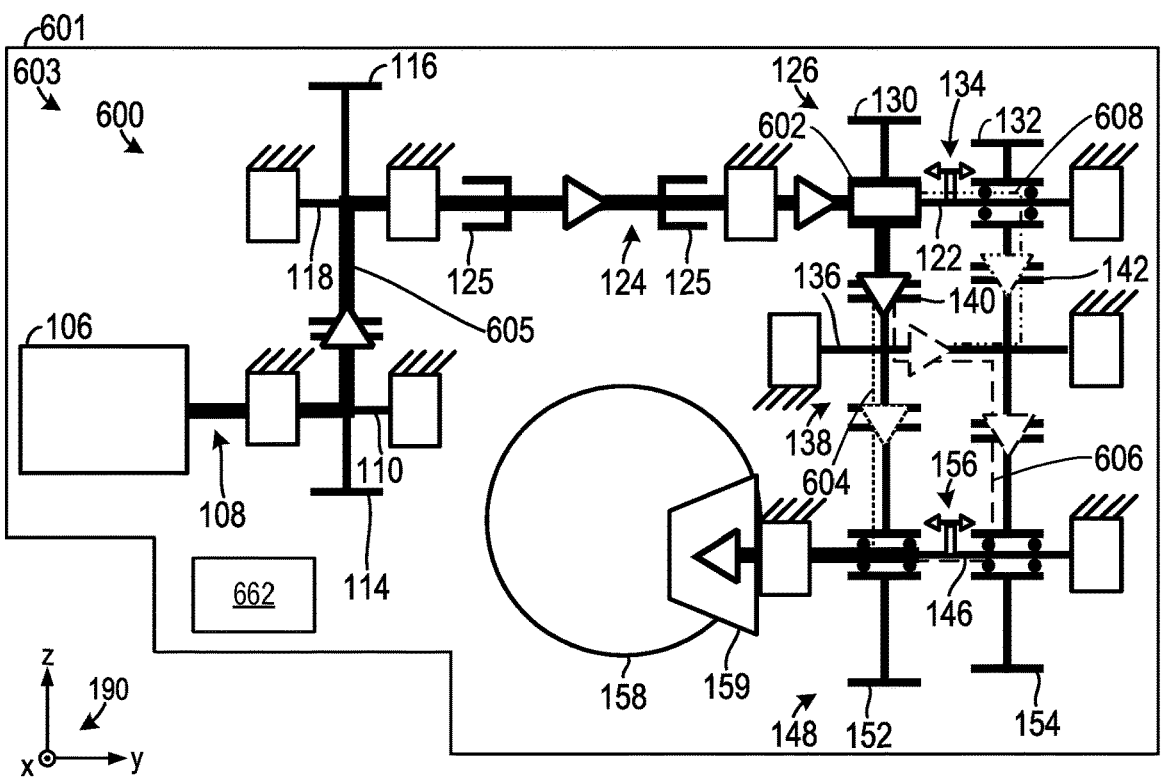
FIG. 6 shows a fourth transmission and power paths through the fourth transmission of the line of transmissions depicted in FIG. 2.
Figure 7:
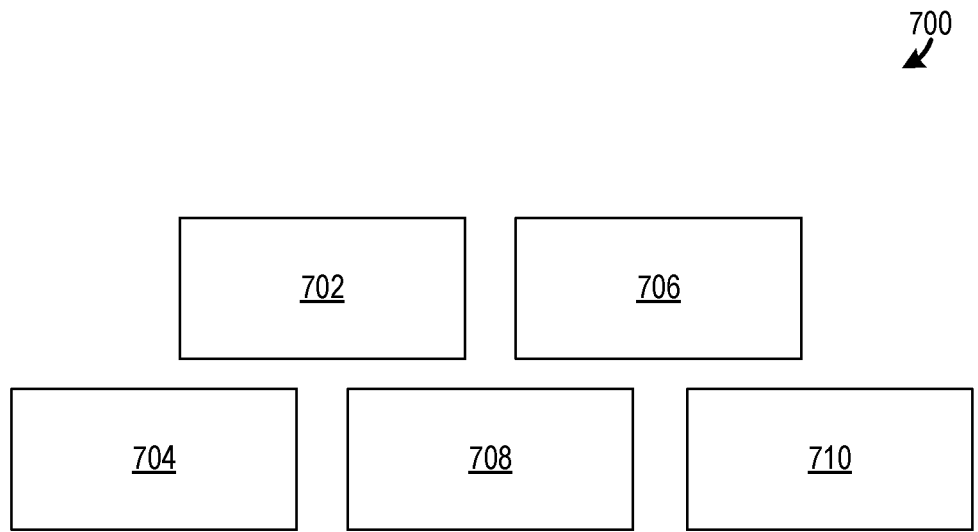
FIG. 7 shows a line of transmissions that include the first, second, third, and fourth transmissions of FIG. 3-6.
Figure 8:
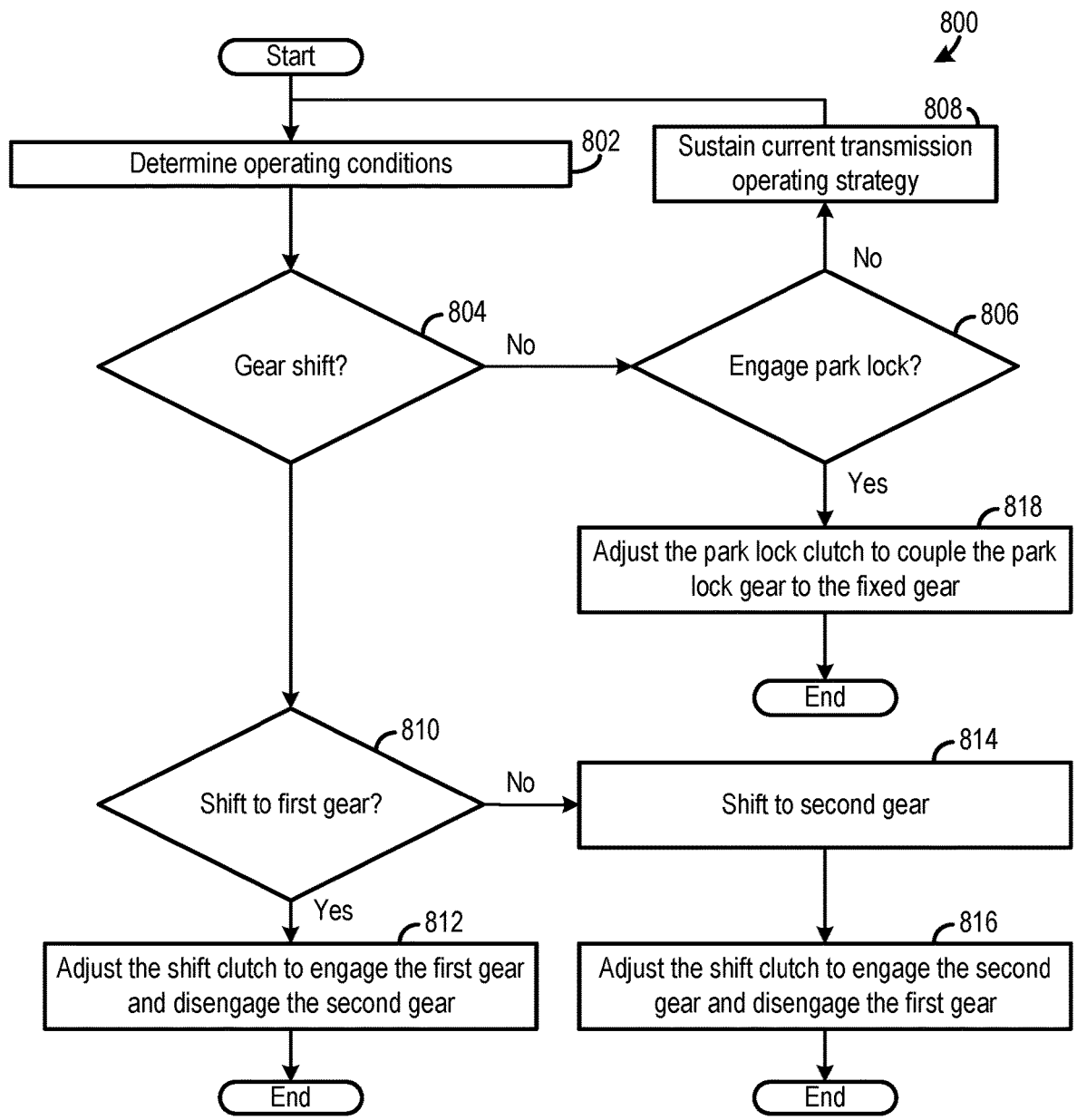
FIG. 8 shows a method for operating a two-speed, dual-clutch transmission with a park lock function.

A multi-speed dual-clutch transmission that compactly achieves at least three gear ratios via a gearing arrangement on three parallel shafts is illustrated in FIG. 1. A table depicting a line of transmissions that may be built from a common set of transmission hardware is illustrated in FIG. 2. FIG. 3 shows a first transmission of the line of transmissions depicted in FIG. 2. FIG. 4 shows a second transmission of the line of transmissions depicted in FIG. 2. FIG. 5 shows a third transmission of the line of transmissions depicted in FIG. 2. FIG. 6 shows a fourth transmission of the line of transmissions depicted in FIG. 2. FIG. 7 shows a line of transmissions, including the multi-speed, dual clutch transmission, a first two-speed transmission having a park lock, a second two-speed transmission having a park lock, a third two-speed transmission having a park lock, and a fourth two-speed transmission having a park lock. FIG. 8 shows an example method of operation for the disclosed line of transmissions.

FIG. 1 depicts a system 100 with a drivetrain 102 including a transmission 104. In one example, the transmission 104 may be a multi-speed, dual-clutch transmission designed to provide up four speeds or operating modes. By modifying elements of the drivetrain 102, a first clutch of the layout may be used for gear shifting between two speeds of the up to four speeds and a second clutch may be used for a park lock or park brake function. The drivetrain 102 may include an electric motor and be an electric drivetrain and the system may correspondingly be an electric vehicle (EV), in one example. In other examples, the drivetrain may include an internal combustion engine (ICE), or other form of primary propulsion system. The transmissions described herein may be used in industrial machines or in other systems where a gear change is desired.

An electric motor 106 is included in the drivetrain 102. The electric motor may include conventional components such as a stator, rotor, rotor shaft, and the like to enable the electric motor to generate mechanical power and electrical energy, when the motor is designed for regeneration.

An output shaft 108 of the electric motor 106 may be coupled to a shaft 110 that may be supported by bearings 112. As described herein, a bearing is a component that supports a shaft or other rotational device and permits rotation thereof. To achieve this functionality, the bearings 112 as well as the other bearings described herein may for example include inner races, outer races, roller elements (e.g., spherical balls, cylindrical rollers, or tapered rollers), and the like. The shaft 110 may have a gear 114 fixedly coupled thereto. The gears described herein each include a plurality of teeth that are profiled to mate with adjacent gears. The types of gears arranged on the transmission shafts may specifically be helical gears and/or spur gears. Further, meshed pairs of gears will be designed with similar gear types.

The gear 114 may mesh with a gear 116 on a shaft 118. The gears 114, 116 may therefore form an initial gear reduction. The gear reduction may be 1.171:1, in one use-case example. However, numerous suitable gear ratios have been contemplated. The gear ratio selected for the initial gear reduction, and the other gear passes described herein may be selected based on a variety of factors such as the expected operating speed of the motor, the expected transmission load, a desired vehicle speed range, and the like. Bearings 120 may be coupled to the shaft 118.

The shaft 118 may be coupled to an input shaft 122 via an intermediate shaft 124. However, in alternate embodiments, the shaft 118 may be directly coupled to the input shaft 122 or the shaft 124. It will be appreciated that the input shaft receives mechanical power from the upstream components. However, during regeneration operation the input shaft may transfer mechanical power to the upstream components.

Mechanical couplings 125 (e.g., splines, yokes, joints such as U-joints, and the like) may be used to rotationally couple the intermediate shaft 124 to the shaft 118 and the input shaft 122. A first pair of gears 126 is arranged on the input shaft 122, and bearings 128 may be coupled to the input shaft 122. The pair of gears 126 specifically includes a first gear 130 and a second gear 132. A first clutch 134 is positioned between the first gear 130 and the second gear 132 and is designed to selectively engage one of the gears while disengaging the other gear. Further, the first clutch 134 may be designed to operate in a neutral configuration where both of the gears are disengaged from the input shaft. When the first clutch 134 disengages one of the first gear 130 or the second gear 132, the gear is allowed to independently rotate with regard to the input shaft 122. To enable the first gear 130 and the second gear 132 to independently rotate with regard to the input shaft 122, first bearings 133 and second bearings 135 (e.g., needle bearings) may be positioned between the first gear 130 and the second gear 132 and the input shaft 122, respectively.

Conversely, when the first clutch 134 engages one of the first gear 130 or the second gear 132, the engaged gear and the input shaft 122 rotate in unison while the input shaft 122 independently rotates in relation to the other gear that is not engaged. To accomplish this functionality, the first clutch 134 may be, but is not limited to, a dog clutch. The dog clutch may include a splined sleeve and/or radially aligned plates with teeth that are designed to mate with splines and/or teeth, respectively, in the first gear 130 and the second gear 132. Alternatively, the first clutch 134 may be a synchronizer with a ring that allows the speeds of the shaft and the gear to be synchronized during clutch engagement. Still further in other examples, the first clutch 134 may be a wet or dry friction clutch. The friction clutches may include sets of plates that frictionally engage and disengage one another, during clutch engagement and disengagement.

Alternatively, in examples where the transmission is built to operate the first clutch 134 as a parking lock, one of the first gear 130 and the second gear 132 is fixedly coupled to the input shaft 122 and one of the first bearings 133 and the second bearings 135 may be omitted. Such an arrangement is described in more detail with reference to FIGS. 2-7.

The transmission 104 further includes a layshaft 136 with a second pair of gears 138 fixedly coupled thereto such that the layshaft 136 and the gears jointly rotate during transmission operation. The second pair of gears 138 specifically includes first layshaft gear 140 and second layshaft gear 142. Bearings 144 may be coupled to the layshaft 136. The first layshaft gear 140 is radially aligned with the first gear 130 and meshes therewith. Likewise, the second layshaft gear 142 is radially aligned with the second gear 132 and meshes therewith. In one example, one of the gears in the first pair of gears 126 may have a larger pitch diameter than the radially aligned meshing gear on the layshaft 136. For instance, first gear 130 may have a larger pitch diameter than the first layshaft gear 140. Consequently, a speed-up occurs across said mesh which may result in reduced inertia when shifting, thereby enhancing shifting performance.

The transmission 104 further includes an output shaft 146. A third pair of gears 148 is arranged on the output shaft 146, and bearings 150 may be coupled to the output shaft 146. The pair of gears specifically includes a third gear 152 and a fourth gear 154. The third gear 152 is radially aligned with the first layshaft gear 140 and meshes therewith, and the fourth gear 154 is radially aligned with the second layshaft gear 142 and meshes therewith.

A second clutch 156 is positioned between the third gear 152 and the fourth gear 154 and is designed to selectively engage one of the gears while disengaging the other gear. Further, the second clutch 156 may be designed to operate in a neutral configuration where both the gears are disengaged from the input shaft. When the second clutch 156 disengages one of the third gear 152 and the fourth gear 154, the gear that is disengaged is allowed to independently rotate in relation to the output shaft 146. To permit rotation of the third gear 152 and the fourth gear 154, third bearings 155 and fourth bearings 157 (e.g., needle bearings) may be positioned between the third gear 152 and the fourth gear 154 and the output shaft 146, respectively.

Conversely, when the second clutch 156 engages one of the third gear 152 and the fourth gear 154, the gear that is engaged and the output shaft 146 rotate in unison. To accomplish this functionality, the clutch may be, but is not limited to, a dog clutch, a synchronizer, or a friction clutch. The first clutch 134 and the second clutch 156 may have a similar design, in one example, to simplify manufacturing and repair. For instance, first clutch 134 and the second clutch 156 may each be dog clutches or synchronizers. However, in other examples, the first clutch 134 and the second clutch 156 may be a combination of different designs. Further, the clutches may be, but are not limited to, hydraulically, pneumatically, and/or electro-mechanically actuated, in one example, or a combination.

Alternatively, in examples where the transmission is built to operate the second clutch 156 as a parking lock, one of the third gear 152 or the fourth gear 154 is fixedly coupled to the output shaft 146 and one of the third bearings 155 and fourth bearings 157 may be omitted. Such an arrangement is described in more detail with reference to FIGS. 2-7.

The output shaft 146 is rotationally coupled to a gear 158 (e.g., a ring gear) in a differential, or other suitable downstream component, via gear 159 (e.g., pinion gear). Alternatively, the gear 158 may be coupled to a driveline or may be another suitable type of mechanical interface. The gear 159 may specifically be a bevel gear, in one example. However, a variety of suitable output gears have been contemplated (e.g., helical, spur). Further, the input shaft 122, the layshaft 136, and the output shaft 146 may be parallel to one another and are spaced apart in space along the z-axis and x-axis. In this way, multiple sets of gears may be efficiently meshed and packaged on the different transmission shafts.

As shown in FIG. 1, the system 100 may further include a control system 160 with a controller 162. The controller 162 may include a microcomputer with components such as a processor 164 (e.g., a microprocessor unit), input/output ports, an electronic storage medium 166 for executable programs and calibration values, e.g., a read-only memory chip, random access memory, keep alive memory, a data bus, and the like. The storage medium may be programmed with computer readable data representing instructions executable by a processor for performing the methods, control techniques, and the like described herein as well as other variants that are anticipated but not specifically listed. Therefore, the electronic storage medium 166 may hold instructions stored therein that when executed by the processor 164 cause the controller 162 to perform the various method steps described herein.

The controller 162 may receive various signals from sensors 168 coupled to different regions of the system 100 and specifically the transmission 104. For example, the sensors 168 may include motor speed sensors, shaft/gear speed sensors, a pedal position sensor to detect a depression of an operator-actuated pedal (e.g., an accelerator pedal and/or a brake pedal), speed sensors at the vehicle wheels, and the like. An input device 169 (e.g., accelerator pedal, brake pedal, gear selector, combinations thereof, and the like) may further provide input signals indicative of the intent of an operator for vehicle control.

Upon receiving the signals from the various sensors 168 of FIG. 1, the controller 162 processes the received signals, and employs various actuators 170 of system components to adjust the components based on the received signals and instructions stored on the memory of controller 162. For example, the controller 162 may receive an accelerator pedal signal indicative of an operator request for a vehicle acceleration adjustment. In response, the controller 162 may command operation of the electric motor 106 to increase the power delivered from the motor to the transmission 104. The controller 162 may, during certain operating conditions, be designed to send commands to the first clutch 134 and the second clutch 156 that in response use actuators to engage or disengage selected gears. The other controllable components in the vehicle may function in a similar manner with regard to sensor signals, control commands, and actuator adjustment, for example.

An axis system 190 is provided in FIG. 1, as well as FIGS. 2-3B, for reference. The z-axis may be a vertical axis (e.g., parallel to a gravitational axis), the x-axis may be a lateral axis (e.g., horizontal axis), and/or the y-axis may be a longitudinal axis. Further each of the shafts 110, 118, 122, 136, and 146 have rotational axes, and the rotational axis 192 of motor 106 is provided for reference. The rotational axis 192 may be axially offset from the output shaft 146. In other words, there may be a variance in position of the location of the rotational axis 192 and the output shaft along the z-axis. In this way, the transmission may have a desired amount of drop, which may permit the system to be efficiently incorporated into certain vehicle platforms.

In other embodiments, additional gears may be added to the input shaft, the layshaft, and/or the output shaft. For instance, the transmission may be designed with nine speeds by adding a third row of gears to the input shaft, the layshaft, and the output shaft. A sixteen speed arrangement may be achieved by adding a fourth row of gears to the parallel shafts. In this way, a shorter (e.g., minimal) length of the transmission can be maintained while increasing the available gear range. In yet other embodiments, additional clutchable gears (e.g., high or low gears) may be added solely to the input shaft and the intermediate shaft or solely to the output shaft. In these embodiments, the transmission achieves six or eight speeds in the same length as the three or four speed transmission.

To shift between the operating gears of the transmission, the first clutch or the second clutch is adjusted to engage one of the gears in the associated gear pair with the corresponding shaft and disengage the other gear in the associated gear pair. This arrangement is advantageous as a single clutch may be operated to shift between a first speed and a second speed, herein operating modes or modes, while the other clutch may be operated to selectively engage the park lock function, as detailed below, or may be operated to shift between additional speeds depending on the transmission build.

FIG. 2 illustrates a table 200 describing a line of transmissions that may be built from the elements of the transmission 104 described with reference to FIG. 1. The table 200 includes a first transmission, a second transmission, a third transmission, and a fourth transmission. Each transmission has two operating modes and a park lock function. The operating modes include a first mode, a second mode, a third mode, and a fourth mode. The operating modes represent the different discrete operating gears that have corresponding gear ratios. The transmission shifts between the gear ratios through operation of the first clutch 134 or the second clutch 156. The park lock function is built by fixing a gear of the first pair of gears 126 or the second pair of gears 148 to the corresponding shaft. The transmission engages the park lock function through operation of one of the first clutch 134 or the second clutch 156 to rotationally couple the coaxial gear opposing the fixed gear to the corresponding shaft. In each transmission of the line of transmissions, the gear mesh between gears 116 and 114 is active and the gear mesh between gears 158 and 159 is active. When a gear mesh is active, a power path travels through said gear mesh. Further, it will be understood that the gear mesh formed between gears 116 and 114 may be omitted from the transmission, in other embodiments, and the motor may be directly coupled to the input shaft 122 shown in FIG. 1.

The gear ratios associated with the different modes may sequentially decrease. For instance, in one use-case example, the first mode gear ratio may be 26.00:1, the second mode gear ratio may be 14.43:1, the third mode gear ratio may be 12.13:1, and the fourth mode gear ratio may be 6.73:1. However, numerous ratios for each mode have been contemplated. The range of ratios as well as the step between the ratios in the different operating modes may be selected based on a variety of factors such as the expected operating speed range of the motor, the expected range of transmission loads, desired vehicle speed ranges, and the like. The specific sizing of the gears is a combination of selecting the desired gear ratios in each of the different operating modes and determining the gear geometry, such that both radially aligned gear meshes engage, and meet the gear design targets. In the aforementioned use-case example, the ratios in the second and third operating modes are relatively close in value.

In one example, the first transmission may shift between the first mode and the second mode using the second clutch 156. The park lock function is built by fixing the second gear 132 to the input shaft 122. The park lock function is engaged by engaging the first gear 130 to lock rotation of the first gear 130 to the input shaft 122 with the first clutch 134. As the second gear 132 is already fixed to the input shaft 122, the powertrain will lock up or four square. The park lock function may not be met if shifting in neutral. The park lock function will not be met if the second clutch 156 is in neutral position as the output shaft 146 is free to rotate independently of the third gear 152 and the fourth gear 154. The first transmission and power paths therethrough are described in more detail with reference to FIG. 3.

In one example, the second transmission may shift between the second mode and the fourth mode using the first clutch 134. The park lock function is built by fixing the fourth gear 154 to the output shaft. The park lock function is engaged by engaging the third gear 152 to lock rotation of the third gear 152 to the output shaft 146 with the second clutch 156. As the fourth gear is already fixed to the output shaft 146, the powertrain will lock up. The park lock function may not be met if the first clutch 134 is shifted to neutral. This is the case because the first gear 130 and the second gear 132 in this situation are free to rotate on the input shaft 122 and will be free to rotate. The output shaft 146 is not grounded to the housing in this configuration, so the first clutch 134 is put in gear for the park lock function to work. The second transmission and power paths therethrough are described in more detail with reference to FIG. 4.

In one example, the third transmission may shift between the first mode and the third mode using the first clutch 134. The park lock function is built by fixing the third gear 152 to the output shaft 146. The park lock function is engaged by engaging the fourth gear 154 to lock rotation of the fourth gear 154 to the output shaft 146. As the third gear 152 is already fixed to the output shaft 146, the powertrain will lock up. The park lock function may be met if shifting in neutral. The third transmission and power paths therethrough are described in more detail with reference to FIG. 5.

In one example, the fourth transmission may shift between the third mode and the fourth mode using the second clutch 156. The park lock function is built by fixing the first gear 130 to the input shaft 122. The park lock function is engaged by engaging the second gear 132 to lock rotation of the second gear 132 to the input shaft 122. As the first gear 130 is already fixed to the input shaft 122, the powertrain will lock up. The park lock function may not be met if the second clutch 156 is in neutral position as the output shaft 146 is free to rotate independently of the third gear 152 and the fourth gear 154. The fourth transmission and power paths therethrough are described in more detail with reference to FIG. 6.

FIG. 3 depicts a system 301 with a drivetrain 303 including a first transmission 300, and a first controller 362. The first transmission 300 may be the same or similar to the first transmission introduced with reference to the table 200 in FIG. 2. The first transmission 300 may be built from the components of transmission 104 of the system 100 described with reference FIG. 1. Components of the first transmission 300 that are identical to the transmission 104 are numbered the same and not reintroduced.

The first transmission 300 is a two speed transmission having a first clutch for shifting between the two speeds and a second clutch used for engaging a park lock or parking brake function. In the example, the second clutch 156 may be operated to shift between a first operation mode and a second operation mode by selectively engaging one of the third gear 152 and the fourth gear 154 of the second pair of gears 148. The second gear 132 of the first pair of gears 126 is fixed to the input shaft 122. The second gear 132 may be fixed to the input shaft using splines, a press fit, a keyway, a bolt, a weld, integrated directly to the input shaft 122, or other similar methods. In the example, first splines 302 mechanically couple the second gear 132 to the input shaft. The first gear 130 may be free to rotate on bearings (e.g., first bearings 133 in FIG. 1). The park lock may be engaged by operating the first clutch 134 to rotationally couple the first gear 130 to the input shaft 122.

A first power path 304 and a second power path 306 are illustrated depicting the first mode of operation and the second mode of operation, respectively. A shared travel path 305 of first power path 304 and the second power path 306 is shown with a thicker line and arrows indicating direction. Where the first power path 304 departs from the shared travel path 305, the first power path 304 is shown with a dotted line and arrows indicating direction. Where the second power path 306 departs from the shared travel path 305, the second power path 306 is shown with a dashed line and arrows indicating direction. For each mode, the power paths travel from the output shaft 108 of motor 106 to the shaft 110, from the shaft 110 to the gear 114, from the gear 114 to the gear 116, from the shaft 118 to the shaft 124 through one of the mechanical couplings 125, from the shaft 124 to the input shaft 122 via one of the mechanical couplings 125. However, as previously discussed the motor 106 may be directly coupled to shaft 118 or the input shaft 122, in alternate embodiments. The power paths travel from and from the input shaft 122 to the second gear 132. Further, for each operation mode, the power paths flow through the output shaft 146 to the gear 159 and then from gear 159 to gear 158. Subsequently, the power paths may travel through a differential, axle shafts, and to the drive wheels.

In the first mode of operation of the first transmission 300, the first power path 304 travels from the second gear 132 to the second layshaft gear 142, from the second layshaft gear 142 to the layshaft 136, from the layshaft 136 to the first layshaft gear 140, from the first layshaft gear 140 to the third gear 152, and from the third gear 152 to the output shaft 146. In the first mode, the gear mesh formed between the second layshaft gear 142 and the second gear 132 is active, along with the gear mesh formed between third gear 152 and the first layshaft gear 140. The first power path 304 moves across the layshaft 136, from the second layshaft gear 142 to the first layshaft gear 140. Further, in the first mode, the second clutch 156 rotationally couples the output shaft 146 to the third gear 152.

In the second mode of operation of the first transmission 300, the second power path 306 travels from the second gear 132 to the second layshaft gear 142, from the second layshaft gear 142 to the fourth gear 154, and from the fourth gear 154 to the output shaft 146. In the second mode, the mesh formed between the second layshaft gear 142 and the second gear 132 is active, and the mesh formed between the fourth gear 154 and second layshaft gear 142 is active. In the second mode, the second power path 306 travels through radially aligned gear meshes. Further, in the second mode, the second clutch 156 rotationally couples the output shaft 146 to the fourth gear 154.

A third power path 308 is illustrated depicting power flow with the park lock engaged e.g., a first park lock mode. The third power path 308 is shown with a dot-dot-dash line and arrows indicating direction. Operating the first clutch 134 to rotationally couple the first gear 130 to the input shaft 122 puts the powertrain in the first park lock mode. The third power path 308 travels from the first gear 130 to the first layshaft gear 140, from the first layshaft gear 140 to the layshaft 136, from the layshaft 136 to the second layshaft gear 142. As the mesh formed between the second gear 132 and second layshaft gear 142 is active, the powertrain locks up or four squares.

The first controller 362 may be similar to the controller 162 described with reference to FIG. 1. For example, the first controller 362 may be included in control system 160 along with the sensors 168, actuator 170, and so on, previously described. In one example, the first controller 362 may include instructions that when executed by the first controller 362 cause the first controller 362 to operate the second clutch 156 to shift between two discrete gear ratios, e.g., the first mode of operation and the second mode of operation, based on one or more operating conditions. Further, the instructions may cause the first controller 362 to operate the first clutch 134 to couple the first gear 130 to the input shaft 122, based on one or more operating conditions. For example, the one or more operating conditions may include vehicle operating conditions such as an input device position (e.g., gearshift lever position, accelerator pedal position, and the like), clutch configuration, vehicle speed, vehicle load, transmission load, motor speed, ambient temperature, and the like.

In this way, by using the first clutch for shifting between the first mode of operation and the second mode of operation, and the second clutch for engaging the first park lock mode, the first transmission 300 provides a two speed transmission with a park lock function.

FIG. 4 depicts a system 401 with a drivetrain 403 including a second transmission 400, and a second controller 462. The second transmission 400 may be the same or similar to the second transmission introduced with reference to the table 200 in FIG. 2. The second transmission 400 may be built from the components of transmission 104 of the system 100 described with reference FIG. 1. Components of the second transmission 400 that are identical to the transmission 104 are numbered the same and not reintroduced.

The second transmission 400 is a two speed transmission having a first clutch for shifting between the two speeds and a second clutch used for engaging a park lock or parking brake function. In the example, the first clutch 134 may be operated to shift between the second operation mode (e.g., the same discrete gear ratio as the second operation mode described with reference to the first transmission 300) and a fourth operation mode by selectively engaging one of the first gear 130 and the second gear 132 of the first pair of gears 126. The fourth gear 154 of the second pair of gears 148 is fixed to the output shaft 146. In the example, second splines 402 mechanically couple the fourth gear 154 to the output shaft 146, however other methods are possible. The third gear 152 may be free to rotate on bearings (e.g., third bearings 155 in FIG. 1). The park lock may be engaged by operating the second clutch 156 to rotationally couple the third gear 152 to the output shaft 146.

A first power path 404 and a second power path 406 are illustrated depicting the second mode of operation and the fourth mode of operation, respectively. A shared travel path 405 of first power path 404 and the second power path 406 is shown with a thicker line and arrows indicating direction. Where the first power path 404 departs from the shared travel path 405, the first power path 404 is shown with a dotted line and arrows indicating direction. Where the second power path 406 departs from the shared travel path 405, the second power path 406 is shown with a dashed line and arrows indicating direction. For each mode, the power paths travel from the output shaft 108 of motor 106 to the shaft 110, from the shaft 110 to the gear 114, from the gear 114 to the gear 116, from the shaft 118 to the shaft 124 through one of the mechanical couplings 125, and from the shaft 124 to the input shaft 122 via one of the mechanical couplings 125. Further, for each mode, the power paths flow through the second layshaft gear 142 to the fourth gear 154, from the fourth gear 154 to the output shaft 146, and from the output shaft 146 to the gear 159 and then from gear 159 to gear 158.

Similar to the first transmission 300, in the second mode of operation of the second transmission 400, the first power path 404 travels from the input shaft 122 to the second gear 132, from the second gear 132 to the second layshaft gear 142, from the second layshaft gear 142 to the fourth gear 154, and from the fourth gear 154 to the output shaft 146. Further, in the second mode, the first clutch 134 rotationally couples the input shaft 122 to the second gear 132 in the second transmission 400.

In the fourth mode of operation of the second transmission 400, the second power path 406 travels from the input shaft 122 to the first gear 130, from the first gear 130 to the first layshaft gear 140, from the first layshaft gear 140 to the layshaft 136, from the layshaft 136 to the second layshaft gear 142, from the second layshaft gear 142 to the fourth gear 154, and from the fourth gear 154 to the output shaft 146. The second power path 406 moves across the layshaft 136, from the first layshaft gear 140 to second layshaft gear 142. The power path crosses flow that longitudinally traverses the layshaft (along an axis parallel to the y-axis). In the fourth mode, the first clutch 134 rotationally couples the input shaft 122 to the first gear 130.

A third power path 408 is illustrated depicting power flow with the park lock engaged e.g., a second park lock mode. The third power path 408 is shown with a dot-dot-dash line and arrows indicating direction. Operating the second clutch 156 to rotationally couple the third gear 152 to the output shaft 146 puts the powertrain in the second park lock mode. The third power path 408 travels from the first layshaft gear 140 to the third gear 152. As the mesh formed between the fourth gear 154 and second layshaft gear 142 is active, the powertrain locks up or four squares.

The second controller 462 may be similar to the controller 162 described with reference to FIG. 1. For example, the second controller 462 may be included in the control system 160 along with the sensors 168, actuator 170, and so on, previously described. In one example, the second controller 462 may include instructions that when executed by the second controller 462 cause the second controller 462 to operate the first clutch 134 to shift between two discrete gear ratios, e.g., the second mode of operation and the fourth mode of operation, based on one or more operating conditions. Further, the instructions may cause the second controller 462 to operate the second clutch 156 to couple the third gear 152 to the output shaft 146, based on one or more operating conditions.

In this way, by using the second clutch for shifting between the second mode of operation and the fourth mode of operation, and the first clutch for engaging the second park lock mode, the second transmission 400 provides a two speed transmission with a park lock function.

FIG. 5 depicts a system 501 with a drivetrain 503 including a third transmission 500, and a third controller 562. The third transmission 500 may be the same or similar to the third transmission introduced with reference to the table 200 in FIG. 2. The third transmission 500 may be built from the components of transmission 104 of the system 100 described with reference FIG. 1. Components of the third transmission 500 that are identical to the transmission 104 are numbered the same and not reintroduced.

The third transmission 500 is a two speed transmission having a first clutch for shifting between the two speeds and a second clutch used for engaging a park lock or parking brake function. In the example, the first clutch 134 may be operated to shift between the first operation mode (e.g., the same discrete gear ratio as the first operation mode described with reference to the first transmission 300) and a third operation mode by selectively engaging one of the first gear 130 and the second gear 132 of the first pair of gears 126. The third gear 152 of the second pair of gears 148 is fixed to the output shaft 146. In the example, third splines 502 mechanically couple the third gear 152 to the output shaft 146, however other methods are possible. The fourth gear 154 may be free to rotate on bearings (e.g., fourth bearings 157 in FIG. 1). The park lock may be engaged by operating the second clutch 156 to rotationally couple the fourth gear 154 to the output shaft 146.

A first power path 504 and a second power path 506 are illustrated depicting the first mode of operation and the third mode of operation, respectively. A shared travel path 505 of first power path 504 and the second power path 506 is shown with a thicker line and arrows indicating direction. Where the first power path 504 departs from the shared travel path 505, the first power path 504 is shown with a dotted line and arrows indicating direction. Where the second power path 506 departs from the shared travel path 505, the second power path 506 is shown with a dashed line and arrows indicating direction. For each mode, the power paths travel from the output shaft 108 of motor 106 to the shaft 110, from the shaft 110 to the gear 114, from the gear 114 to the gear 116, from the shaft 118 to the shaft 124 through one of the mechanical couplings 125, and from the shaft 124 to the input shaft 122 via one of the mechanical couplings 125. Further, for each mode, the power paths flow through the output shaft 146 to the gear 159 and then from gear 159 to gear 158.

Similar to the first transmission 300, in the first mode of operation of the third transmission 500, the first power path 504 travels from the input shaft 122 to the second gear 132, from the second gear 132 to the second layshaft gear 142, from the second layshaft gear 142 to the layshaft 136, from the layshaft 136 to the first layshaft gear 140, from the first layshaft gear 140 to the third gear 152, and from the third gear 152 to the output shaft 146. Further, in the first mode, the first clutch 134 rotationally couples the input shaft 122 to the second gear 132.

In the third mode of operation of the third transmission 500, the second power path 506 travels from the input shaft 122 to the first gear 130, from the first gear 130 to the first layshaft gear 140, from the first layshaft gear 140 to the third gear 152, and from the third gear 152 to the output shaft 146. In the third mode, the first clutch 134 rotationally couples the input shaft 122 to the first gear 130. Again, the power path through the three parallel shafts traverses radially aligned gear meshes, similar to the second mode A third power path 508 is illustrated depicting power flow with the park lock engaged e.g., a third park lock mode. The third power path 508 is shown with a dot-dot-dash line and arrows indicating direction. Operating the second clutch 156 to rotationally couple the fourth gear 154 to the output shaft 146 puts the powertrain in the third park lock mode. The third power path 508 travels from the second layshaft gear 142 to the fourth gear 154. As the mesh formed between the third gear 152 and first layshaft gear 140 is active, the powertrain locks up or four squares.

The third controller 562 may be similar to the controller 162 described with reference to FIG. 1. For example, the third controller 562 may be included in the control system 160 along with the sensors 168, actuator 170, and so on, previously described. In one example, the third controller 562 may include instructions that when executed by the third controller 562 cause the third controller 562 to operate the first clutch 134 to shift between two discrete gear ratios, e.g., the first mode of operation and the third mode of operation, based on one or more operating conditions. Further, the instructions may cause the third controller 562 to operate the second clutch 156 to couple the fourth gear 154 to the output shaft 146, based on one or more operating conditions.

In this way, by using the first clutch for shifting between the first mode of operation and the third mode of operation, and the second clutch for engaging the third park lock mode, the third transmission 500 provides a two speed transmission with a park lock function.

FIG. 6 depicts a system 601 with a drivetrain 603 including a fourth transmission 600, and a fourth controller 662. The fourth transmission 600 may be the same or similar to the fourth transmission introduced with reference to the table 200 in FIG. 2. The fourth transmission 600 may be built from the components of transmission 104 of the system 100 described with reference FIG. 1. Components of the fourth transmission 600 that are identical to the transmission 104 are numbered the same and not reintroduced.

The fourth transmission 600 is a two speed transmission having a first clutch for shifting between the two speeds and a second clutch used for engaging a park lock or parking brake function. In the example, the second clutch 156 may be operated to shift between the third operation mode (e.g., the same discrete gear ratio as the third operation mode described with reference to the third transmission 500) and the fourth operation mode (e.g., the same discrete gear ratio as the fourth operation mode described with reference to the second transmission 400) by selectively engaging one of the third gear 152 and the fourth gear 154 of the second pair of gears 148. The first gear 130 of the first pair of gears 126 is mechanically coupled to the input shaft 122 by fourth spines 602, however other methods are possible. The second gear 132 may be free to rotate on bearings (e.g., second bearings 135 in FIG. 1). The park lock may be engaged by operating the first clutch 134 to rotationally couple the second gear 132 to the input shaft 122.

A first power path 604 and a second power path 606 are illustrated depicting the third mode of operation and the fourth mode of operation, respectively. A shared travel path 605 of first power path 604 and the second power path 606 is shown with a thicker line and arrows indicating direction. Where the first power path 604 departs from the shared travel path 605, the first power path 604 is shown with a dotted line and arrows indicating direction. Where the second power path 606 departs from the shared travel path 605, the second power path 606 is shown with a dashed line and arrows indicating direction. For each mode, the power paths travel from the output shaft 108 of motor 106 to the shaft 110, from the shaft 110 to the gear 114, from the gear 114 to the gear 116, from the shaft 118 to the shaft 124 through one of the mechanical couplings 125, from the shaft 124 to the input shaft 122 via one of the mechanical couplings 125, from the input shaft 122 to the first gear 130. However, as previously discussed the motor 106 may be directly coupled to shaft 118 or the input shaft 122, in alternate embodiments. Further, for each operation mode, the power paths flow through the output shaft 146 to the gear 159 and then from gear 159 to gear 158. Subsequently, the power paths may travel through a differential, axle shafts, and to the drive wheels Similar to the third transmission 500, in the third mode of operation of the fourth transmission 600, the first power path 604 travels from the first gear 130 to the first layshaft gear 140, from the first layshaft gear 140 to the third gear 152, and from the third gear 152 to the output shaft 146. In the third mode, the second clutch 156 rotationally couples the output shaft 146 to the third gear 152. Again, the power path through the three parallel shafts traverses radially aligned gear meshes, similar to the second mode.

Similar to the second transmission 400, in the fourth mode of operation of the fourth transmission 600, the second power path 606 travels from the first gear 130 to the first layshaft gear 140, from the first layshaft gear 140 to the layshaft 136, from the layshaft 136 to the second layshaft gear 142, from the second layshaft gear 142 to the fourth gear 154, and from the fourth gear 154 to the output shaft 146. The second power path 606 moves across the layshaft 136, from the first layshaft gear 140 to second layshaft gear 142. In the fourth mode, the second clutch 156 rotationally couples the output shaft 146 to the fourth gear 154.

A third power path 608 is illustrated depicting power flow with the park lock engaged e.g., a fourth park lock mode. The third power path 608 is shown with a dot-dot-dash line and arrows indicating direction. Operating the first clutch 134 to rotationally couple the second gear 132 to the input shaft 122 puts the powertrain in the fourth park lock mode. The third power path 608 travels from the second gear 132 to the second layshaft gear 142, from the second layshaft gear 142 to the layshaft 136, from the layshaft 136 to the first layshaft gear 140. As the mesh formed between the first gear 130 and first layshaft gear 140 is active, the powertrain locks up.

The fourth controller 662 may be similar to the controller 162 described with reference to FIG. 1. For example, the fourth controller 662 may be included in control system 160 along with the sensors 168, actuator 170, and so on, previously described. In one example, the fourth controller 662 may include instructions that when executed by the fourth controller 662 cause the fourth controller 662 to operate the second clutch 156 to shift between two discrete gear ratios, e.g., the third mode of operation and the fourth mode of operation, based on one or more operating conditions. Further, the instructions may cause the fourth controller 662 to operate the first clutch 134 to couple the second gear 132 to the input shaft 122, based on one or more operating conditions. For example, the one or more operating conditions may include vehicle operating conditions such as an input device position (e.g., gearshift lever position, accelerator pedal position, and the like), clutch configuration, vehicle speed, vehicle load, transmission load, motor speed, ambient temperature, and the like.

In this way, by using the second clutch for shifting between the third mode of operation and the fourth mode of operation, and the first clutch for engaging the fourth park lock mode, the fourth transmission 600 provides a two speed transmission with a park lock function.

FIG. 7 illustrates a line of transmissions 700. In one example, the line of transmissions comprises a first transmission 702, a second transmission 704, a third transmission 706, a fourth transmission 708, and a fifth transmission 710. In one example, the line of transmissions 700 may be the same or similar to the line of transmissions described with reference to FIGS. 2-6. In one example, the line of transmissions 700 may include the multi-speed, dual-clutch transmission described with reference to FIG. 1.

In one example, the first transmission 702 may be the same or similar to the first transmission 300 described with reference to FIG. 3. For example, the first transmission 702 may have a first clutch that is a shift clutch for shifting between a first speed and a second speed and a second clutch that is a park lock clutch for selectively engaging a park lock function. The second transmission 704 may be the same or similar to the second transmission 400 described with reference to FIG. 4. For example, the second transmission 704 may use the second clutch as the shift clutch to shift between the second speed and a fourth speed and the first clutch as the park lock clutch to selectively engage the park lock function. The third transmission 706 may be the same or similar to the third transmission 500 described with reference to FIG. 5. For example, the third transmission 706 use the second clutch as the shift clutch to shift between the first speed and a third speed and the first clutch as the park lock clutch to selectively engage the park lock function. The fourth transmission 708 may be the same or similar to the fourth transmission 600 described with reference to FIG. 6. For example, the fourth transmission 708 may use the first clutch as the shift clutch to shift between the third speed and the fourth speed and the second clutch as the park lock clutch to selectively engage the park lock function. The fifth transmission 710 may be the same or similar to the transmission 104. For example, the fifth transmission 710 may use the first clutch and the second clutch to shift between the four actual speeds or three usable speeds.

FIG. 8 shows an example of a method 800 for operation of a transmission. The method 800 specifically corresponds to operation of a transmission of the line of transmissions shown in FIGS. 2-7. In the example, the method 800 corresponds to operation of the transmission in a vehicle. However, the method 800 may be implemented via other suitable transmissions and other suitable applications, in other examples. Furthermore, the method 800 may be implemented by a controller including a processor and memory, as previously discussed.

At 802, the method includes determining operating conditions. The operating conditions may include the layout of the transmission including, for example, which clutch is the gear shift clutch (e.g., the first clutch 134 or the second clutch 156), which clutch is the park lock clutch (e.g., the first clutch 134 or the second clutch 156), and engagement of which gear engages the park lock (e.g., the first gear 130, the second gear 132, the third gear 152, or the fourth gear 154). The operating conditions may include input device position (e.g., gearshift lever position, accelerator pedal position, and the like), clutch configuration, vehicle speed, vehicle load, transmission load, motor speed, ambient temperature, and the like. The operating conditions may be ascertained via sensor inputs, modeling, look-up tables, and/or other suitable techniques.

At 804, the method judges if a gear shift is desired. This judgement may be automatically implemented based on motor speed, accelerator pedal position, brake pedal position, vehicle speed, vehicle load, and the like. Alternatively, this judgement may be implemented responsive to operator interaction with a gear selector.

If a gear shift is not desired, the method moves to 806. At 806, the method judges if engagement of a park lock is desired. This judgement may be automatically implemented based on motor speed, accelerator pedal position, brake pedal position, vehicle speed, and the like. Alternatively, this judgement may be implemented responsive to operator interaction with a park selector.

If engagement of the park lock is not desired, the method includes sustaining the current transmission operating strategy at 808. For instance, the transmission may remain in its current operating gear and the clutches therefore remain in their current position.

If engagement of the park lock is desired, the method includes adjusting the park lock clutch to couple the park lock gear to the fixed gear at 818. In one example, the park lock gear may be the coaxial gear arranged opposite from the fixed gear. The park lock clutch may be the coaxial clutch interposed between the fixed gear and the park lock gear. In one example, the fixed gear may be the second gear 132, the park lock gear may be the first gear 130, and the park lock clutch may be the first clutch 134. In such an example, the method includes adjusting the first clutch 134 to couple the first gear 130 to the input shaft 122. In a second example, the fixed gear may be the fourth gear 154, the park lock gear may be the third gear 152, and the park lock clutch may be the second clutch 156. In such an example, the method includes adjusting the second clutch 156 to couple the third gear 152 to the output shaft 146.

On the other hand, if at 804 a gear shift is desired, the method judges at 810 if a gear shift to a first gear is desired. In one example, the first gear may be the higher gear ratio of the two speeds of the transmission based on the layout of the transmission. For example, the first gear may be one of the first operating mode, the second operating mode, and the third operating mode described with reference to FIG. 2. This judgement may be automatically implemented based on motor speed, accelerator pedal position, brake pedal position, vehicle speed, vehicle load, and the like. Alternatively, this judgement may be implemented responsive to operator interaction with the gear selector.

If at 810 a shift to first gear is desired, at 812 the method includes adjusting the shift clutch to engage the first gear and disengage the second gear. In one example, if shifting from the second mode to the first mode, the method includes adjusting the second clutch 156 to engage the third gear 152 and disengage the fourth gear 154. In a second example, if shifting from the fourth mode to the second mode, the method includes adjusting the first clutch 134 to engage the second gear 132 and disengage the first gear 130.

On the other hand, if at 810 a gear shift is the first gear is not desired, the method judges a shift to second gear is desired at 814. In one example, the second gear may be the lower gear ratio of the two speeds of the transmission based on the layout of the transmission. For example, the second gear may be one of the second operating mode, the third operating mode, and the fourth operating mode described with reference to FIG. 2. This judgement may be automatically implemented based on motor speed, accelerator pedal position, brake pedal position, vehicle speed, vehicle load, and the like. Alternatively, this judgement may be implemented responsive to operator interaction with the gear selector.

At 816, the method includes adjusting the shift clutch to engage the second gear and disengage the first gear. In one example, if shifting from the first mode to the second mode, the method includes adjusting the second clutch 156 to engage the fourth gear 154 and disengage the third gear 152. In a second example, if shifting from the second mode to the fourth mode, the method includes adjusting the first clutch 134 to engage first gear 130 and disengage the second gear 132.

In this way, it is possible to provide a range of gear ratios and a parking brake or park lock using a common set of transmission hardware thus providing a modular electric powertrain solution that supports a variety of vehicle applications and stakeholders. The line of transmissions may be built efficiently and reliably from the common set of transmission hardware, avoiding some of the challenges associated with more complex solutions, such as adding an external park brake or incorporating an additional clutch. The technical effect of the line transmissions described herein is adding a parking brake to a compact, multi-speed transmission.

FIG. 1 and FIGS. 3-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The disclosure also provides support for a line of transmissions, comprising: a first transmission, a second transmission, wherein each transmission includes an input shaft with a first pair of gears that reside thereon, a first clutch positioned between the first pair of gears and designed to selectively rotationally couple at least one of a first gear and a second gear of the first pair of gears to the input shaft, a layshaft with a second pair of gears fixedly coupled thereto, an output shaft with a third pair of gears that reside thereon, and a second clutch positioned between the third pair of gears and designed to selectively rotationally couple at least one of a third gear and a fourth gear in the third pair of gears to the output shaft, wherein the first transmission has the second gear of the first pair of gears fixed to the input shaft and the first clutch selectively couples the first gear of the first pair of gears to the input shaft to realize a park lock function, and wherein the second transmission has the fourth gear of the third pair of gears fixed to the output shaft and the second clutch selectively couples the third gear of the third pair of gears to the output shaft to realize the park lock function. In a first example of the system, a third transmission has the third gear of the third pair of gears fixed to the output shaft and the second clutch selectively couples the fourth gear of the third pair of gears to the output shaft to realize the park lock function. In a second example of the system, optionally including the first example, a fourth transmission has the first gear of the first pair of gears fixed to the input shaft and the first clutch selectively couples the second gear of the first pair of gears to the input shaft to realize the park lock function. In a third example of the system, optionally including one or both of the first and second examples, the system further comprises: a first controller for the first transmission including instructions that when executed by the first controller cause the first controller to: operate the second clutch to shift between two discrete gear ratios based on one or more operating conditions, and operate the first clutch to couple the first gear to the input shaft based on one or more operating conditions. In a fourth example of the system, optionally including one or more or each of the first through third examples, the system further comprises: a second controller for the second transmission including instructions that when executed by the second controller cause the second controller to: operate one of the first clutch to shift between two discrete gear ratios based on one or more operating conditions, and operate one of the second clutch to couple the third gear to the output shaft based on one or more operating conditions. In a fifth example of the system, optionally including one or more or each of the first through fourth examples, the system further comprises: a third controller including instructions that when executed by the third controller cause the third controller to: operate the first clutch to shift between two discrete gear ratios based on one or more operating conditions, and operate the second clutch to couple the fourth gear to the output shaft based on one or more operating conditions. In a sixth example of the system, optionally including one or more or each of the first through fifth examples, the system further comprises: a fourth controller including instructions that when executed by the fourth controller cause the fourth controller to: operate the second clutch to shift between two discrete gear ratios based on one or more operating conditions, and operate the first clutch to couple the second gear to the input shaft based on one or more operating conditions. In a seventh example of the system, optionally including one or more or each of the first through sixth examples, one of the first gear and the second gear in the first pair of gears has a larger pitch diameter than a radially aligned meshing gear included in the second pair of gears on the layshaft. In an eighth example of the system, optionally including one or more or each of the first through seventh examples, the input shaft is rotationally coupled to an electric motor. In a ninth example of the system, optionally including one or more or each of the first through eighth examples, the first pair of gears, the second pair of gears, and the third pair of gears are helical gears. In a tenth example of the system, optionally including one or more or each of the first through ninth examples, the first clutch, and the second clutch are dog clutches or synchronizers.

The disclosure also provides support for a method for operating a transmission, comprising: operating one of a first clutch and a second clutch to shift between two operating modes in the transmission, and operating one of the first clutch and the second clutch to engage a park lock, wherein the first clutch is positioned on an input shaft between a first pair of gears and designed to selectively rotationally couple at least one of a first gear and a second gear of the first pair of gears to the input shaft, wherein a layshaft with a second pair of gears fixedly rotationally coupled thereto is positioned between the input shaft and an output shaft, and wherein the second clutch is positioned on the output shaft between a third pair of gears and designed to selectively rotationally couple at least one of a third gear and a fourth gear in the third pair of gears to the output shaft. In a first example of the method, in a first transmission the second gear of the first pair of gears is fixed to the input shaft and the operating one of the first clutch and the second clutch to shift between two operating modes in the transmission includes solely operating the second clutch to shift between a first operating mode and a second operating mode in the transmission and the operating one of the first clutch and the second clutch to engage the park lock includes solely operating the first clutch to engage the park lock. In a second example of the method, optionally including the first example, in a second transmission the fourth gear of the third pair of gears is fixed to the output shaft and the operating one of the first clutch and the second clutch to shift between two operating modes in the transmission includes solely operating the first clutch to shift between a first operating mode and a fourth operating mode in the transmission and the operating one of the first clutch and the second clutch to engage the park lock includes solely operating the second clutch to engage the park lock. In a third example of the method, optionally including one or both of the first and second examples, in a third transmission the third gear of the third pair of gears is fixed to the output shaft and the operating one of the first clutch and the second clutch to shift between two operating modes in the transmission includes solely operating the first clutch to shift between a first operating mode and a third operating mode in the transmission and the operating one of the first clutch and the second clutch to engage the park lock includes solely operating the second clutch to engage the park lock. In a fourth example of the method, optionally including one or more or each of the first through third examples, in a fourth transmission the first gear of the first pair of gears is fixed to the input shaft and the operating one of the first clutch and the second clutch to shift between two operating modes in the transmission includes solely operating the second clutch to shift between a third operating mode and a fourth operating mode in the transmission and the operating one of the first clutch and the second clutch to engage the park lock includes solely operating the first clutch to engage the park lock.

The disclosure also provides support for a system, comprising: an electric motor, an input shaft rotationally coupled to the electric motor, a first clutch designed to selectively rotationally couple at least one of a first gear and a second gear in a first pair of gears to the input shaft, wherein the first pair of gears and the input shaft are coaxial, a layshaft with a second pair of gears fixedly coupled thereto and meshing with the first pair of gears, an output shaft arranged coaxial to a third pair of gears and parallel to the input shaft and the layshaft, wherein the third pair of gears mesh with the second pair of gears, and a second clutch designed to selectively rotationally couple at least one of a third gear and a fourth gear in the third pair of gears to the output shaft, wherein one of the first gear, the second gear, the third gear, and the fourth gear is fixed to the corresponding shaft, and wherein the clutch corresponding to the fixed gear selectively engages a park lock. In a first example of the system, the system further comprises: a controller including instructions that when executed by the controller cause the controller to: operate one of the first clutch and the second clutch to shift between two discrete gear ratios based on one or more operating conditions, and operate one of the first clutch and the second clutch to couple the coaxial gear opposing the fixed gear to the corresponding shaft based on one or more operating conditions. In a second example of the system, optionally including the first example, the electric motor is axially offset from the output shaft. In a third example of the system, optionally including one or both of the first and second examples, the first pair of gears, the second pair of gears, and the third pair of gears are helical gears.

In another representation, a line of transmissions is provided, comprising: a first transmission and a second transmission, wherein each transmission includes an input shaft with a first pair of gears that reside thereon; a first clutch positioned between the first pair of gears and designed to selectively rotationally couple at least one of a first gear and a second gear of the first pair of gears to the input shaft; a layshaft with a second pair of gears fixedly coupled thereto; an output shaft with a third pair of gears that reside thereon; and a second clutch positioned between the third pair of gears and designed to selectively rotationally couple at least one of a third gear and a fourth gear in the third pair of gears to the output shaft, wherein the first transmission has one of the first gear and the second gear fixed to the input shaft and the first clutch selectively engages a parking brake, and wherein the second transmission has one of the third gear and the fourth gear of the third pair of gears fixed to the output shaft and the second clutch selectively engages a parking brake.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the vehicle and/or drivetrain control system. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations, and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric motors, internal combustion engines, and/or transmissions. The technology can be used as a stand-alone, or used in combination with other power transmission systems not limited to machinery and propulsion systems for tandem axles, electric tag axles, P4 axles, hybrid electric vehicles (HEVs), BEVs, agriculture, marine, motorcycle, recreational vehicles and on and off highway vehicles, as an example. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A line of transmissions, comprising:
   a first transmission;
   a second transmission;

wherein each transmission includes
an input shaft with a first pair of gears that reside thereon;
a first clutch positioned between the first pair of gears and designed to selectively rotationally couple at least one of a first gear and a second gear of the first pair of gears to the input shaft;
a layshaft with a second pair of gears fixedly coupled thereto;
an output shaft with a third pair of gears that reside thereon; and
a second clutch positioned between the third pair of gears and designed to selectively rotationally couple at least one of a third gear and a fourth gear in the third pair of gears to the output shaft,
wherein the first transmission has the second gear of the first pair of gears fixed to the input shaft and the first clutch selectively couples the first gear of the first pair of gears to the input shaft to realize a park lock function, and
wherein the second transmission has the fourth gear of the third pair of gears fixed to the output shaft and the second clutch selectively couples the third gear of the third pair of gears to the output shaft to realize the park lock function.

2. The line of transmissions of claim 1, wherein a third transmission has the third gear of the third pair of gears fixed to the output shaft and the second clutch selectively couples the fourth gear of the third pair of gears to the output shaft to realize the park lock function.

3. The line of transmissions of claim 1, wherein a fourth transmission has the first gear of the first pair of gears fixed to the input shaft and the first clutch selectively couples the second gear of the first pair of gears to the input shaft to realize the park lock function.

4. The line of transmissions of claim 1, further comprising a first controller for the first transmission including instructions that when executed by the first controller cause the first controller to:
operate the second clutch to shift between two discrete gear ratios based on one or more operating conditions, and
operate the first clutch to couple the first gear to the input shaft based on one or more operating conditions.

5. The line of transmissions of claim 1, further comprising a second controller for the second transmission including instructions that when executed by the second controller cause the second controller to:
operate one of the first clutch to shift between two discrete gear ratios based on one or more operating conditions, and
operate one of the second clutch to couple the third gear to the output shaft based on one or more operating conditions.

6. The line of transmissions of claim 2, further comprising a third controller including instructions that when executed by the third controller cause the third controller to:
operate the first clutch to shift between two discrete gear ratios based on one or more operating conditions, and
operate the second clutch to couple the fourth gear to the output shaft based on one or more operating conditions.

7. The line of transmissions of claim 3, further comprising a fourth controller including instructions that when executed by the fourth controller cause the fourth controller to:
operate the second clutch to shift between two discrete gear ratios based on one or more operating conditions, and
operate the first clutch to couple the second gear to the input shaft based on one or more operating conditions.

8. The line of transmissions of claim 1, wherein one of the first gear and the second gear in the first pair of gears has a larger pitch diameter than a radially aligned meshing gear included in the second pair of gears on the layshaft.

9. The line of transmissions of claim 1, wherein the input shaft is rotationally coupled to an electric motor.

10. The line of transmissions of claim 1, wherein the first pair of gears, the second pair of gears, and the third pair of gears are helical gears.

11. The line of transmissions of claim 1, wherein the first clutch and the second clutch are dog clutches or synchronizers.

12. A method for operating a transmission, comprising:
operating one of a first clutch and a second clutch to shift between two operating modes in the transmission; and
operating one of the first clutch and the second clutch to engage a park lock,
wherein the first clutch is positioned on an input shaft between a first pair of gears and designed to selectively rotationally couple at least one of a first gear and a second gear of the first pair of gears to the input shaft;
wherein a layshaft with a second pair of gears fixedly rotationally coupled thereto is positioned between the input shaft and an output shaft; and
wherein the second clutch is positioned on the output shaft between a third pair of gears and designed to selectively rotationally couple at least one of a third gear and a fourth gear in the third pair of gears to the output shaft.

13. The method of claim 12, wherein in a first transmission the second gear of the first pair of gears is fixed to the input shaft and the operating one of the first clutch and the second clutch to shift between two operating modes in the transmission includes solely operating the second clutch to shift between a first operating mode and a second operating mode in the transmission and the operating one of the first clutch and the second clutch to engage the park lock includes solely operating the first clutch to engage the park lock.

14. The method of claim 12, wherein in a second transmission the fourth gear of the third pair of gears is fixed to the output shaft and the operating one of the first clutch and the second clutch to shift between two operating modes in the transmission includes solely operating the first clutch to shift between a first operating mode and a fourth operating mode in the transmission and the operating one of the first clutch and the second clutch to engage the park lock includes solely operating the second clutch to engage the park lock.

15. The method of claim 12, wherein in a third transmission the third gear of the third pair of gears is fixed to the output shaft and the operating one of the first clutch and the second clutch to shift between two operating modes in the transmission includes solely operating the first clutch to shift between a first operating mode and a third operating mode in the transmission and the operating one of the first clutch and the second clutch to engage the park lock includes solely operating the second clutch to engage the park lock.

16. The method of claim 12, wherein in a fourth transmission the first gear of the first pair of gears is fixed to the input shaft and the operating one of the first clutch and the second clutch to shift between two operating modes in the transmission includes solely operating the second clutch to shift between a third operating mode and a fourth operating mode in the transmission and the operating one of the first clutch and the second clutch to engage the park lock includes solely operating the first clutch to engage the park lock.

17. A system, comprising:
an electric motor;
an input shaft rotationally coupled to the electric motor;
a first clutch designed to selectively rotationally couple at least one of a first gear and a second gear in a first pair of gears to the input shaft, wherein the first pair of gears and the input shaft are coaxial;
a layshaft with a second pair of gears fixedly coupled thereto and meshing with the first pair of gears;
an output shaft arranged coaxial to a third pair of gears and parallel to the input shaft and the layshaft, wherein the third pair of gears mesh with the second pair of gears; and
a second clutch designed to selectively rotationally couple at least one of a third gear and a fourth gear in the third pair of gears to the output shaft;
wherein one of the first gear, the second gear, the third gear, and the fourth gear is fixed to the corresponding shaft, and
wherein the clutch corresponding to the fixed gear selectively engages a park lock.

18. The system of claim 17, further comprising a controller including instructions that when executed by the controller cause the controller to:
operate one of the first clutch and the second clutch to shift between two discrete gear ratios based on one or more operating conditions, and
operate one of the first clutch and the second clutch to couple the coaxial gear opposing the fixed gear to the corresponding shaft based on one or more operating conditions.

19. The system of claim 17, wherein the electric motor is axially offset from the output shaft.

20. The system of claim 17, wherein the first pair of gears, the second pair of gears, and the third pair of gears are helical gears.

* * * * *